US009389491B2

(12) United States Patent
Clearman et al.

(10) Patent No.: US 9,389,491 B2
(45) Date of Patent: Jul. 12, 2016

(54) CAMERA MOUNT WITH SPRING CLAMP
(71) Applicant: GoPro, Inc., San Mateo, CA (US)
(72) Inventors: Christopher Aaron Clearman, Half Moon Bay, CA (US); Nicholas Streets, San Francisco, CA (US)
(73) Assignee: GoPro, Inc., San Mateo, CA (US)
( * ) Notice: Subject to any disclaimer, the term of this patent is extended or adjusted under 35 U.S.C. 154(b) by 0 days.
(21) Appl. No.: 14/452,037
(22) Filed: Aug. 5, 2014
(65) Prior Publication Data
US 2015/0021451 A1  Jan. 22, 2015

Related U.S. Application Data (63) Continuation of application No. 13/998,332, filed on Jul. 22, 2013, now Pat. No. 8,857,775.

(51) Int. Cl.
G09F 7/18 (2006.01)
G03B 17/56 (2006.01)
(52) U.S. Cl.
CPC ............ G03B 17/561 (2013.01); G03B 17/563 (2013.01); Y10T 24/3437 (2015.01);
(Continued)
(58) Field of Classification Search
CPC .................. Y10T 24/44222; Y10T 24/44239; Y10T 24/44231; Y10T 24/44077; Y10T 24/44085; Y10T 24/44094; Y10T 24/3437; Y10T 24/3443; Y10T 24/44291; Y10T 24/44376; Y10T 24/44427; Y10T 24/44436; Y10T 24/44462; Y10T 24/4447; Y10T 24/44615; Y10T 24/44744; G03B 17/561; G03B 17/563
USPC ................. 24/481, 482, 547, 32, 68 R, 68 A; 248/230.4, 230.8
See application file for complete search history.

(56) References Cited

U.S. PATENT DOCUMENTS

| 247,671 | A | * | 9/1881 | McKeever | .............. | B67B 7/186 |
| | | | | | | 81/3.43 |
| 298,872 | A | * | 5/1884 | May | ...................... | B65B 7/2878 |
| | | | | | | 53/329 |
| 497,775 | A | * | 5/1893 | Dickinson | ............... | B67B 7/186 |
| | | | | | | 81/3.43 |
| 3,084,409 | A | | 4/1963 | Griffiths | | |
| 3,757,363 | A | | 9/1973 | Langlais | | |
| 4,741,283 | A | * | 5/1988 | Conner | ................... | B63B 21/00 |
| | | | | | | 114/221 R |

(Continued)

FOREIGN PATENT DOCUMENTS

DE  19520502  12/1996
JP  3083660  2/2002

OTHER PUBLICATIONS

Custom Photo Manufacturing, Inc., "Light Support," Last Modified Jan. 2, 2007, 12 Pages, [Archived on Web.Archive.org], Can be retrieved from <URL:https://web.archive.org/web/20070627225605/http://www.cpmdelta1.com/light_support.htm>.

(Continued)

Primary Examiner — Christopher E Garft
(74) Attorney, Agent, or Firm — Fenwick & West LLP (57) ABSTRACT A camera system is configured to detachably couple to a camera mount, which in turn can be attached to an apparatus. The camera mount is a spring clamp including two arms, each include a handle component and a jaw component. The spring clamp can be attached to an apparatus when the two jaw components are closed around the apparatus. A strap is adjustably coupled to the spring clamp and is tightened around the apparatus to further secure the apparatus. In some cases, a flexible neck is fastened to the camera mount, and the camera system is detachably coupled to the flexible neck. This allows a mounted camera system to be situated at any desired angle for taking photographs.

16 Claims, 8 Drawing Sheets (52) U.S. Cl.
CPC .......... *Y10T24/3443* (2015.01); *Y10T 24/4447* (2015.01); *Y10T 24/44077* (2015.01); *Y10T 24/44291* (2015.01); *Y10T 24/44376* (2015.01); *Y10T 24/44427* (2015.01); *Y10T 24/44436* (2015.01); *Y10T 24/44462* (2015.01); *Y10T 24/44615* (2015.01); *Y10T 24/44744* (2015.01)

(56) References Cited

U.S. PATENT DOCUMENTS

| | | | |
|---|---|---|---|
| 5,033,528 | A | 7/1991 | Volcani |
| 5,103,384 | A | 4/1992 | Drohan |
| 5,397,268 | A | 3/1995 | Chang et al. |
| 5,398,176 | A | 3/1995 | Ahuja |
| 5,435,045 | A * | 7/1995 | Anscher ............... A45F 3/04 224/651 |
| 5,449,206 | A | 9/1995 | Lockwood |
| 5,702,175 | A | 12/1997 | Chen |
| 5,791,210 | A * | 8/1998 | Wolff .................. B25B 5/06 269/254 R |
| 5,847,883 | A | 12/1998 | Rispoli, Sr. |
| D405,457 | S | 2/1999 | Kawashima |
| D442,047 | S | 5/2001 | Hicks |
| 6,328,295 | B1 * | 12/2001 | Hanks .................. B25B 1/205 269/130 |
| 6,357,710 | B1 | 3/2002 | Fielden et al. |
| 6,581,889 | B2 | 6/2003 | Carpenter et al. |
| 6,626,210 | B2 | 9/2003 | Luettgen et al. |
| 6,681,971 | B2 * | 1/2004 | Laverack ............. B60R 9/045 224/319 |
| 6,799,356 | B2 | 10/2004 | Sanchez |
| 6,840,485 | B2 | 1/2005 | Richter |
| 6,842,951 | B1 * | 1/2005 | Barre .................... B25B 7/00 24/499 |
| 6,847,394 | B1 | 1/2005 | Hansen et al. |
| 6,983,930 | B1 | 1/2006 | La Mendola et al. |
| 7,120,461 | B2 | 10/2006 | Cho |
| 7,128,297 | B2 | 10/2006 | Lee |
| 7,422,184 | B2 | 9/2008 | Carnevali |
| 7,533,906 | B2 | 5/2009 | Luettgen et al. |
| 7,766,313 | B2 | 8/2010 | Panosian |
| 7,798,452 | B1 | 9/2010 | Wessells et al. |
| 7,861,985 | B2 | 1/2011 | Galvin |
| 7,891,615 | B2 | 2/2011 | Bevirt |
| 7,926,774 | B1 | 4/2011 | Wilson |
| 8,297,566 | B2 | 10/2012 | Bevirt |
| 8,602,662 | B1 | 12/2013 | Mans |
| 8,727,290 | B1 | 5/2014 | De La Matta et al. |
| 8,740,160 | B2 | 6/2014 | Bevirt |
| 8,857,775 | B1 * | 10/2014 | Clearman ............ G03B 17/561 24/334 |
| 2004/0089778 | A1 | 5/2004 | Valentine et al. |
| 2004/0163216 | A1 * | 8/2004 | Simonson ............. B60P 7/083 24/68 CD |
| 2004/0211868 | A1 | 10/2004 | Holmes et al. |
| 2008/0093516 | A1 | 4/2008 | Bevirt |
| 2008/0283697 | A1 | 11/2008 | Darrow |
| 2010/0078536 | A1 | 4/2010 | Galvin |
| 2010/0171007 | A1 | 7/2010 | Doll et al. |
| 2010/0171009 | A1 | 7/2010 | Lin |
| 2010/0220992 | A1 | 9/2010 | Bevirt |
| 2011/0031359 | A1 | 2/2011 | Lu |
| 2011/0042530 | A1 | 2/2011 | Phillips et al. |
| 2011/0192951 | A1 * | 8/2011 | Gooch .................. F16M 11/12 248/316.7 |
| 2013/0221169 | A1 | 8/2013 | Gooch |

OTHER PUBLICATIONS pashnit.com, "GoPro Idea: Creative Mounting Idea for Your GoPro!," 13 Pages, [Archived on Web.Archive.Org on Feb. 15, 2010] [online] Retrieved from the internet <URL:http://web.archive.org/web/20100215200233/http://www.pashnit.com/product/gopro/gopro_mounting.html>.

Photojojo, "3 Tricks to Turn a Spring Clamp Into Your Best Photo Accessory," [PDF Version] Aug. 6, 2009, 4 Pages, Can be retrieved at <URL:http://content.photojojo.com/tips/spring-clamp-diy-camera-mount/>.

Photojojo, "3 Tricks to Turn a Spring Clamp Into Your Best Photo Accessory," [HTML Version] Aug. 6, 2009, 3 Pages.

Photojojo, "3 Tricks to Turn a Spring Clamp Into Your Best Photo Accessory," [PDF Version] Aug. 6, 2009, 3 Pages.

McMaster-Carr Supply Company, Thumb Screws, No. 3061, 1 Page, Publication date unknown.

McMaster-Carr Supply Company, Clamp and Thumbscrew, 1 Page, Jul. 1, 2009.

Lockwood Products, Inc., Loc-Line, The Original Modular Hose System, Jul. 1, 2008, 22 Pages.

UW-Lighting, halogen Hand-Held Lights, 2006, 7 Pages, Can be retrieved at <URL:http://www.aditech-uw.com/aditechweb/iniluminacion.htm> Archived on web.archive.org on May 16, 2006, Retrieved from the internet <URL:https://web.archive.org/web/20060516081227/http://www.aditech-uw.com/aditechweb/iniluminacion . . . >.

Nasty Clamps, Nasty Clamp Photo 1, Publication date unknown, Printed on Oct. 2, 2014, 1 Page.

Nasty Clamps, Nasty Clamp Photo 2, Publication date unknown, Printed on Oct. 2, 2014, 1 Page.

Shear-Loc Products, "Shear-Loc Quick Reference Guide," Publication date unknown, 2 Pages.

Wimberley, Inc., Wimberley Professional Photo Gear—The Plamp, Archived on web.archive.org on Oct. 15, 2009, 6 Pages, Can be Retrieved at <URL:http://web.archive.org/web/20081015002348/http://www.tripodhead.com/products/plamp-main.cfm>.

Instructables, French Flag / Freedom Flag, Can be Retrieved at <URL:https://web.archive.org/web/20100417102439/http://www.instructables.com/id/French-Flag-Freedom-Flag>, Archived on web.archive.org on Apr. 17, 2010, 5 Pages.

ModularHose.com, Loc-Line World, Can be Retrieved at <URL:http://www.modularhose.com/Loc-Line.htm>, Archived on web.archive.org on Jun. 16, 2009, 3 Pages.

ModularHose.com, Applications—Assistive Technology, Can be Retrieved at <URL:http://www.modularhose.com/applications/Assistive-Technology> Archived on web.archive.org on Oct. 27, 2009, 1 Page.

ModularHose.com, Parts and Supplies, Can be Retrieved at <URL:http://www.modularhose.com/applications/mh-Parts-and-Supplies/>, Archived on web.archive.org on Nov. 6, 2009, 1 Page.

ModularHose.com, Loc-Line 1/2, Can be Retrieved at <URL:http://www.modularhose.com/Loc-Line-12-System/12-miscellaneous>, Archived on web.archive.org on Jun. 22, 2009, 2 Pages.

Dinkum Systems, Inc., Trademark Information for ActionPod, Serial No. 85379756, Mar. 6, 2012, 31 Pages.

Lockwood Products, Inc., Loc-Line, The Original Modular Hose System, Aug. 1, 2012, 24 Pages.

Clamp Flag Co., The Clamp Flag Company, Can be Retrieved at <URL:http://www.clampflag.com/>, Archived on web.archive.org on Sep. 29, 2003, 4 Pages.

Clamp Flag Co., The Clamp Flag in Action!, Can be Retrieved at <URL:http://www.clampflag.com/flag%20in%20action.htm>, Archived on web.archive.org on Nov. 18, 2003, 4 Pages.

Sorrel, C., "Nasty Clamp: DIY Flash-Stand Goes Commercial," Wired Magazine, Jul. 15, 2009, 5 Pages.

Nasty Clamps, NastyClamps.com! Home of the Flexible Photography Clamp!, Retrieved from the internet on Aug. 27, 2014, Can be retrieved at <URL:http://www.nastyclamps.com/>, 4 Pages.

Nasty Clamps, Nasty Clamp Photo 4, Publication Date Unknown, Printed on Oct. 2, 2014, 1 Page.

Nasty Clamps, Nasty Clamp Photo 3, Publication Date Unknown, Printed on Oct. 2, 2014, 1 Page.

Schofield, J., Feeling Nasty! [Video] Can be retrieved at <URL:http://www.thec47.com/gearbox/feeling-nasty.html>, Oct. 30, 2009, 25 Pages.

Schofield, J., Nasty Clamps, Feeling Nasty!, Can be retrieved at <URL:http://www.thec47.com/gearbox/feeling-nasty.html>, Oct. 30, 2009, 10 Pages.

(56) References Cited

OTHER PUBLICATIONS

Nasty Clamps, Nasty Clamp Facebook Timeline, 133 Pages, Retrieved from the internet on Aug. 29, 2014, Can be retrieved at <URL:https://www.facebook.com/pages/Nasty-Clamps/144803988805?sk=timeline&ref=page_internal>.

Tirosh, U., "Nasty Lil' Lighting Thing," DIYPhotography, Can be retrieved at <URL:http://www.diyphotography.net/nasty-lil-lighting-thing/>, Jul. 14, 2009, 14 Page.

Progue, D., "The iPhone Matches Most of Its Hype," The New York Times, Jun. 27, 2007, 3 Pages, Can be Retrieved online <URL:http://www.nytimes.com/2007/06/27/technology/circuits/27pogue.html?_r=0&pagewanted=print>.

McMaster-Carr Supply Company, Catalog No. 114, Spring Clamps (2533-2534), Thumb Screws (3039-3047), Jan. 1, 2008, (Copy Unavailable).

U.S. Appl. No. 61/303,655, filed Feb. 11, 2010, 49 Pages.

Office Action for U.S. Appl. No. 13/998,332, Mar. 25, 2014, 17 Pages.

PCT International Search Report and Written Opinion for PCT/US2014/046551, Aug. 28, 2014, 10 Pages.

* cited by examiner

CAMERA MOUNT WITH SPRING CLAMP

CROSS REFERENCE TO RELATED APPLICATIONS

This application is a continuation of U.S. application Ser. No. 13/998,332, filed Jul. 22, 2013, which is incorporated by reference herein in its entirety.

BACKGROUND

1. Technical Field

This disclosure relates to a camera system, and more specifically, to a spring clamp mount for a camera.

2. Description of the Related Art

Digital cameras are increasingly used in outdoors and sports environments. In order to allow for the safe use of cameras in such environments, the cameras need to be secured to camera mounts, which in turn can be secured to, for example, sports equipment, vehicles, or a user. One such means for securing a camera to a camera mount is a camera housing that securely encloses or partially encloses a camera, and couples to a camera mount. A user experience with a camera mount can be diminished by difficult or inefficient mechanisms for securing and releasing the camera mount to an apparatus. In addition, the user experience can be further complicated if the camera mount does not allow for securing the camera housing at a desired angle for taking photographs.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

FIG. (or "FIG.") 1a illustrates a perspective view of a camera system, according to one embodiment.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Camera System Configuration

A camera system includes a camera and a camera housing structured to at least partially enclose the camera. The camera comprises a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. The camera housing includes a lens window structured on the front surface of the camera housing and configured to substantially align with the camera lens, and one or more indicator windows structured on the front surface of the camera housing and configured to substantially align with the camera indicators.

Figure 1A:
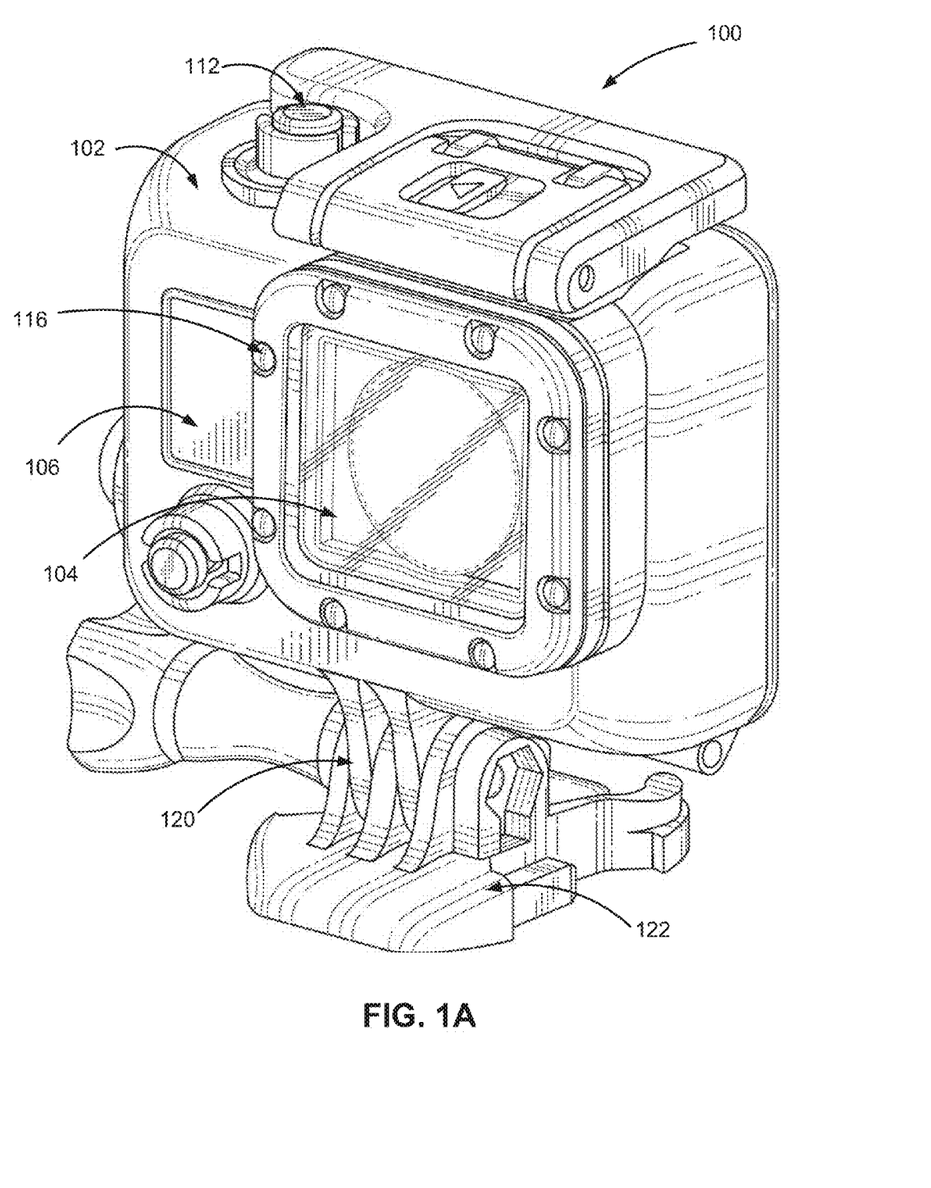
Figure 1B:
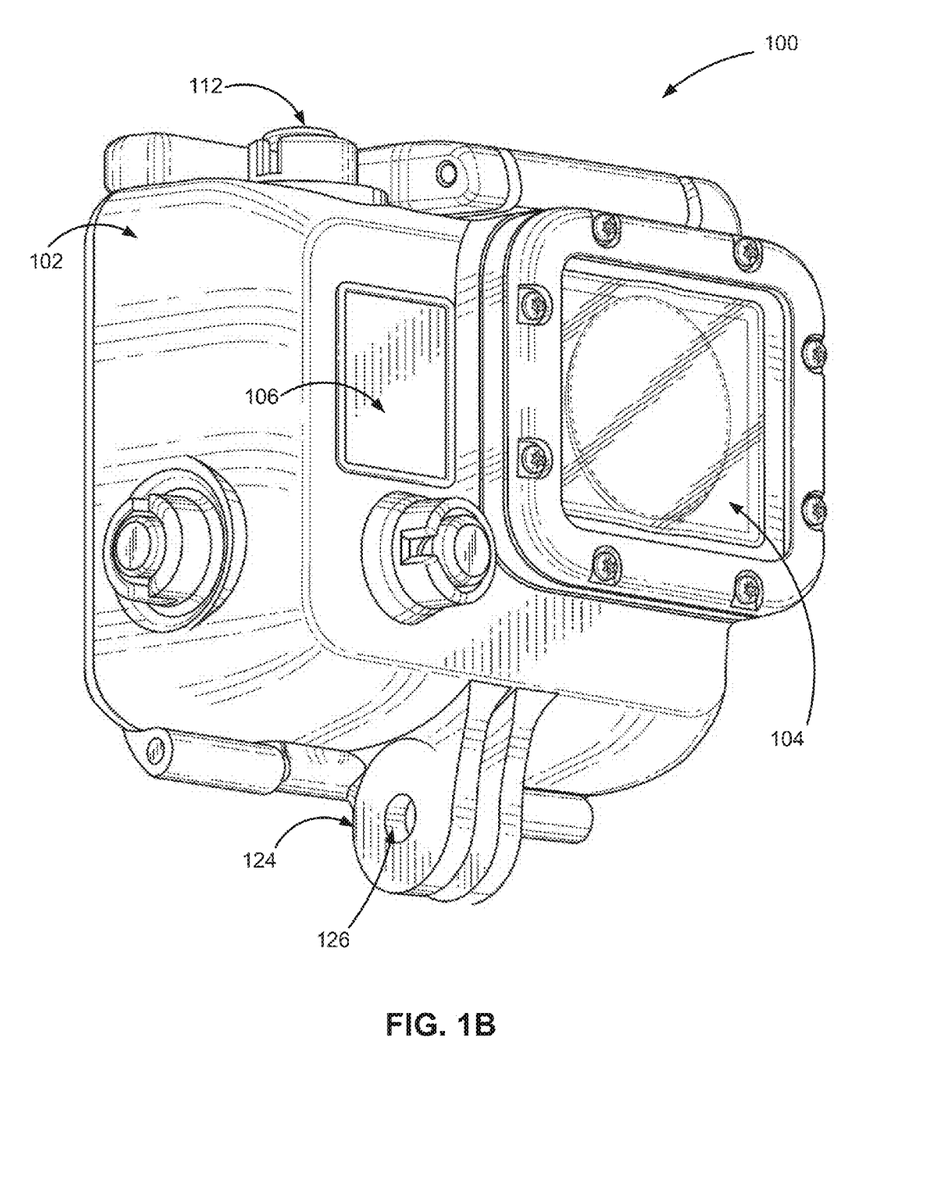
FIG. 1b illustrates another alternative perspective view of a camera system, according to one embodiment.

FIGS. 1a and 1b illustrate various views of a camera system according to one example embodiment. The camera system includes, among other components, a camera housing 100. In one embodiment, a first housing portion 102 includes a front face with four sides (i.e., a top side, bottom side, left side, and right side) structured to form a cavity that receives a camera (e.g. a still camera or video camera). In other embodiments, the camera housing 100 may not include one or more sides or faces. For instance, the camera housing 100 may not include a front or back face, allowing the front face and rear face of the camera to be exposed when partially enclosed by the top side, bottom side, left side, and right side of the camera housing 100.

In one embodiment, the camera housing 100 has a small form factor (e.g., a height of approximately 3 to 6 centimeters, a width of approximately 3 to 7 centimeters, and a depth of approximately 1 to 4 centimeters), and is lightweight (e.g., approximately 50 to 150 grams). The camera housing 100 can be rigid (or substantially rigid) (e.g., plastic, metal, fiberglass, etc.) or pliable (or substantially pliable) (e.g., leather, vinyl, neoprene, etc.). In one embodiment, the camera housing 100 may be appropriately configured for use in various elements. For example, the camera housing 100 may comprise a waterproof enclosure that protects a camera from water when used, for example, while surfing or scuba diving.

Portions of the camera housing 100 may include exposed areas to allow a user to manipulate buttons on the camera that are associated with the camera functionality. Alternatively, such areas may be covered with a pliable material to allow the user to manipulate the buttons through the camera housing 100. For example, in one embodiment the top face of the camera housing 100 includes an outer shutter button 112 structured so that a shutter button 112 of the camera is substantially aligned with the outer shutter button 112 when the camera is secured within the camera housing 100. The shutter button 112 of the camera is operationally coupled to the outer shutter button 112 so that pressing the outer shutter button 112 allows the user to operate the camera shutter button.

In one embodiment, the front face of the camera housing 100 includes a lens window 104 structured so that a lens of the camera is substantially aligned with the lens windows 104 when the camera is secured within the camera housing 100. The lens window 104 can be adapted for use with a conventional lens, a wide angle lens, a flat lens, or any other specialized camera lens. In this embodiment, the lens window 104 comprises a waterproof seal so as to maintain the waterproof aspect of the housing 100.

In one embodiment, the camera housing 100 includes one or more securing structures 120 for securing the camera housing 100 to one of a variety of mounting devices. For example, FIG. 1a illustrates the camera housing secured to a clip-style mount 122. In this example, the camera housing 100 includes a first plurality of protrusions (protrusions 124 as shown in FIG. 1b), and the mount 122 includes a second plurality of protrusions. Each protrusion includes a hole (hole 126 as shown in FIG. 1b) at a similar location within the protrusion such that the first and second pluralities of protrusions can interlock in such a way that the protrusion holes substantially align. Continuing with this example, a turnable handscrew is inserted through the aligned holes, coupling the camera housing 100 to the mount 122 such that the camera housing can pivotally rotate relative to the mount when the turnable handscrew is in a first unlocked position, and such that the camera housing is fixed in position relative to the mount when the turnable handscrew is in a second locked position. In other embodiments, the camera housing 100 can be secured to a different type of mounting structure, and can be secured to a mounting structure via a different type of coupling mechanism.

In one embodiment, the camera housing 100 includes an indicator window 106 structured so that one or more camera indicators are substantially aligned with the indicator window 106 when the camera is secured within the camera housing 100. The indicator window 106 can be any shape or size, and can be made of the same material as the remainder of the camera housing 100, or can be made of any other material, for instance a transparent or translucent material and/or a non-reflective material.

The described housing 100 may also be adapted for a wider range of devices of varying shapes, sizes and dimensions besides cameras. For example, an expansion module may be attached to housing 100 to add expanded features to electronic devices such as cell phones, music players, personal digital assistants ("PDAs"), global positioning system ("GPS") units, or other portable electronic devices.

Figure 1C:
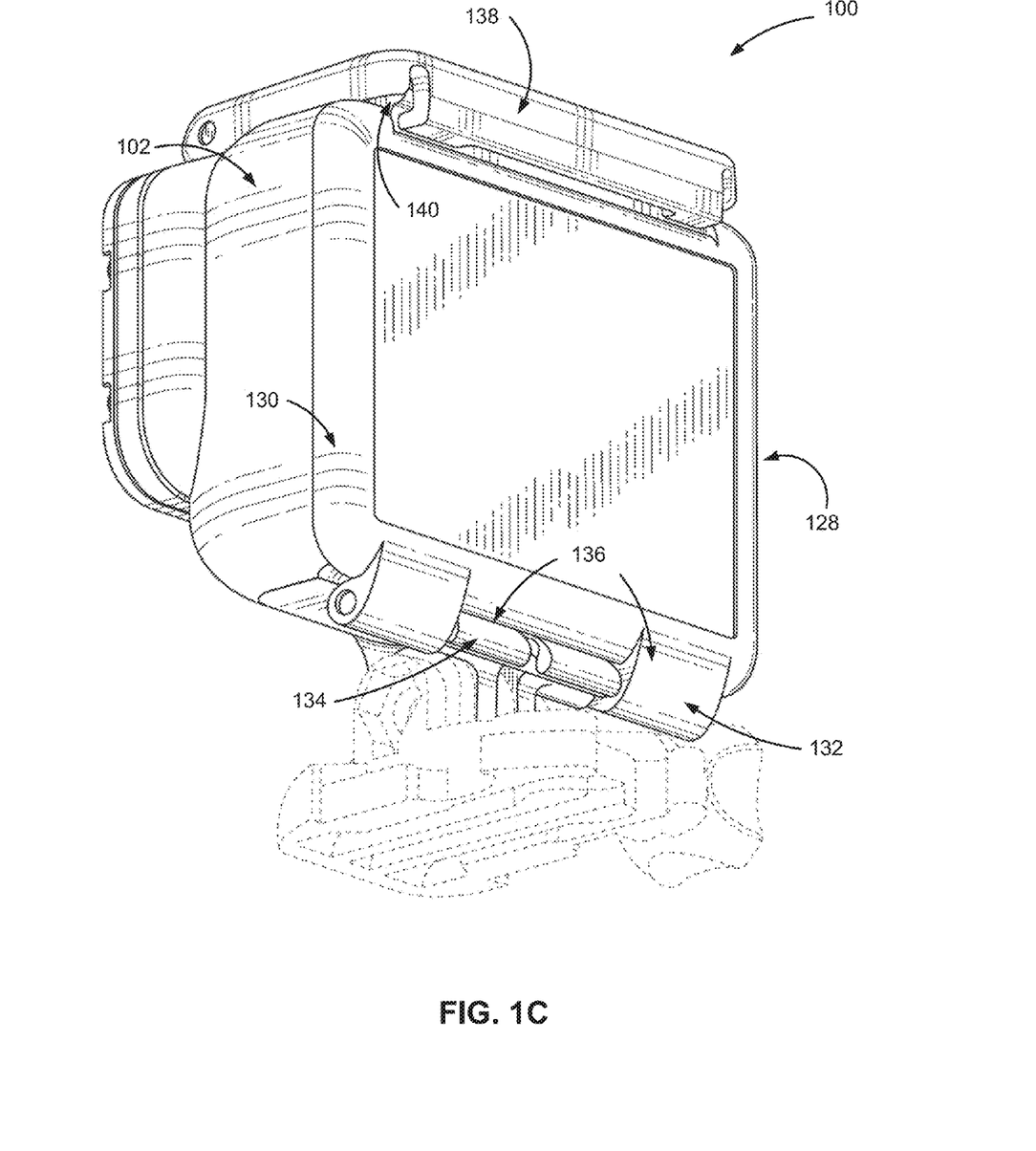
FIG. 1c illustrates a perspective view of a rear of the camera system, according to one embodiment.

FIG. 1c is a rear perspective view of camera housing 100 illustrating a second housing portion 128, according to one example embodiment. The second housing portion 128 detachably couples with the first housing portion 102 opposite the front face of the first housing portion. The first housing portion 102 and second housing portion 128 are collectively structured to enclose a camera within the cavity when the second housing portion 128 is secured to the first housing portion 102 in a closed position.

In one embodiment, the second housing portion 128 comprises a door 130 that allows the camera to be removed from the housing 100. The door 130 pivots around a hinge 136 that allows the door 130 to be opened or shut. In one embodiment, a first fastening structure 138 located on the top face of the camera housing 100 detachably couples to a second fastening structure 140 on the door 130. The fastening structures 138, 140 secure the door 130 to the first portion 102 of the camera housing 100 in a closed position when coupled, as illustrated in FIG. 2. In one embodiment, the fastening structure 138 comprises a hook-shaped lateral bar and the fastening structure 140 comprises an L-shaped bar. The fastening structure 138 can pivot upwards to allow the door 130 to close and can then be pressed down around the fastening structure 140 to hold the door 130 in the closed position. In different embodiments, fastening structures for securing the door 130 can include, for example, a button assembly, a buckle assembly, a clip assembly, a hook and loop assembly, a magnet assembly, a ball and catch assembly, and an adhesive assembly, or any other type of securing mechanism.

In one alternative embodiment, the hinge 136 is instead located on the top face of the housing 100 and the fastening structures 138, 140 are instead located on the bottom face of the housing 100. Alternatively, the hinge 136 and fastening structures 138, 140 may be located on opposite side faces of the camera housing 100.

In one embodiment, the housing 100 includes a watertight seal so that the housing 100 is waterproof when the door 130 is shut. For example, in one embodiment, the door 130 includes a sealing structure positioned on interior edges of the door 130. The sealing structure provides a watertight seal between the first portion of the camera housing 102 and the door 130 when the first securing structure 138 on the top face of the camera housing 100 is coupled to the second securing structure 140 on the top edge of the door 130.

In one embodiment, an outer hinge structure 132 on the bottom edge of the second housing portion 128 detachably couples to an inner hinge structure 134 on the bottom edge of the first housing portion 102 to form the hinge 136. For example, in one embodiment, the outer hinge structure 132 comprises one or more hook-shaped protrusions structured to securely fasten to a rod-shaped member of the inner hinge structure 134. Other mechanisms for coupling the second housing portion 128 to the housing 100 may also be used in various alternative embodiments. In other embodiments, the second housing portion 128 may be permanently attached to the first housing portion 102.

Figure 2A:
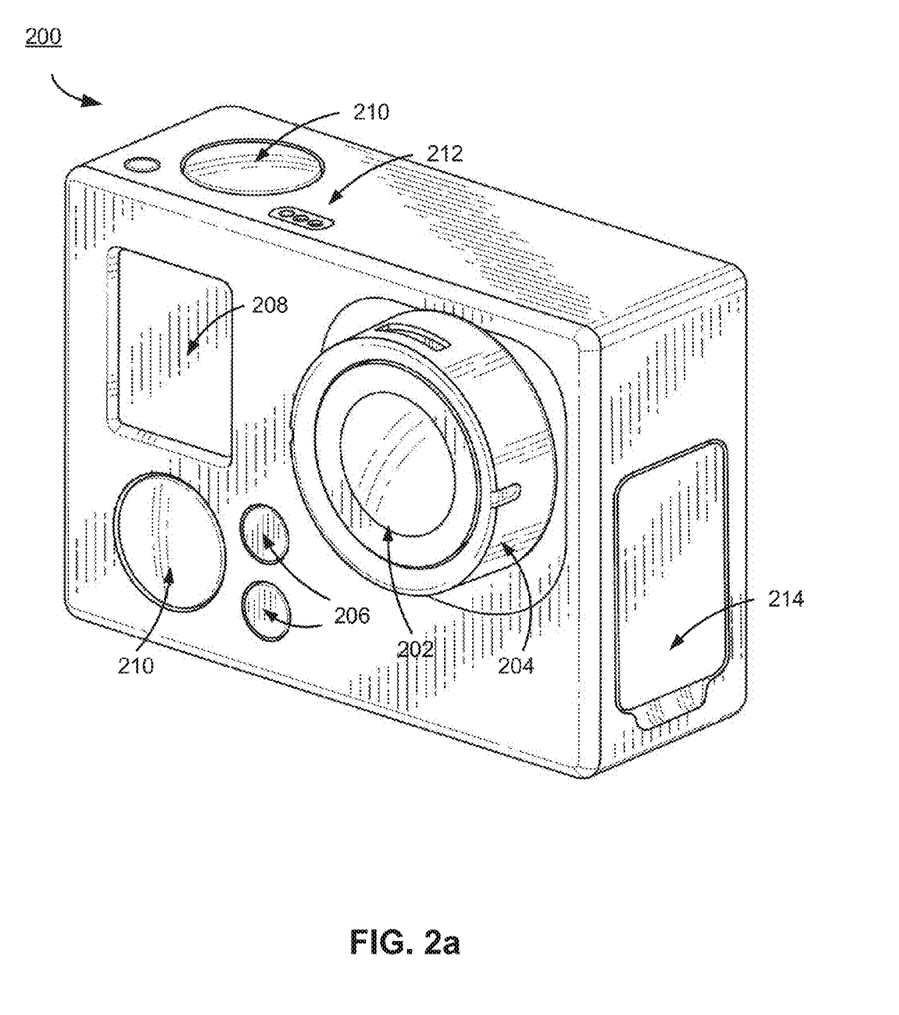
FIG. 2a illustrates a perspective view of a camera for use with the camera system, according to one embodiment.

FIG. 2a illustrates a camera 200 for use with the camera systems described herein, according to one example embodiment. The camera 200 is configured to capture images and video, and to store captured images and video for subsequent display or playback. The camera 200 is adapted to fit within a camera housing, such as the housing 100 discussed above or any other housing described herein. As illustrated, the camera 200 includes a lens 202 configured to receive light incident upon the lens and to direct received light onto an image sensor internal to the lens. The lens 202 is enclosed by a lens ring 204.

The camera 200 can include various indicators, including the LED lights 206 and the LED display 208 shown in FIG. 2a. When the camera 200 is enclosed within the housing 100, the LED display 208 is configured to substantially align with the indicator window 106, and the LED lights 206 are configured to be visible through the housing 100. The camera 200 can also include buttons 210 configured to allow a user of the camera to interact with the camera, to turn the camera on, and to otherwise configure the operating mode of the camera. The camera 200 can also include a microphone 212 configured to receive and record audio signals in conjunction with recording video. The side of the camera 200 includes an I/O interface 214. Though the embodiment of FIG. 2a illustrates the I/O interface 214 enclosed by a protective door, the I/O interface can include any type or number of I/O ports or mechanisms, such as universal serial bus (USB) ports, HDMI ports, memory card slots, and the like.

Figure 2B:
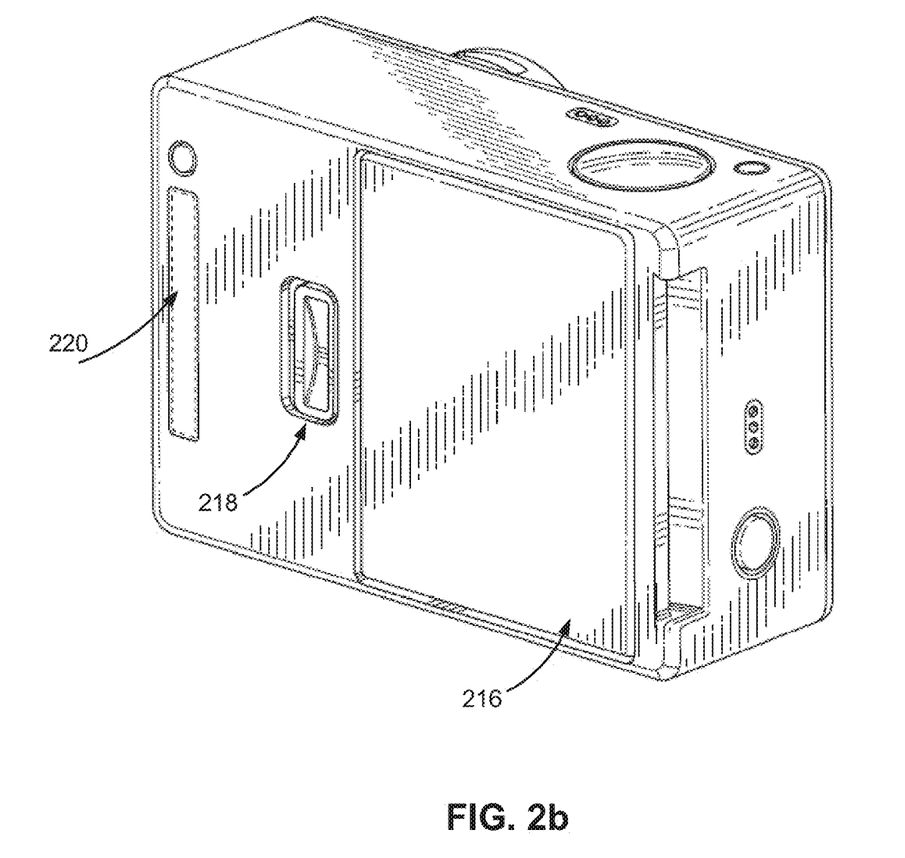
FIG. 2b illustrates a perspective view of a rear of a camera for use with the camera system, according to one embodiment.

FIG. 2b illustrates a perspective view of a rear of a camera 200 for use with the camera system, according to one embodiment. The camera 200 includes a door 216 that covers a removable battery and battery interface. The door 216 can be removed via the door release mechanism 218. The camera also includes an expansion pack interface 220 configured to receive a removable expansion pack, such as a display module, an extra battery module, a wireless module, and the like.

Removable expansion packs, when coupled to the camera 200, provide additional functionality to the camera via the expansion pack interface 220.

Camera Mount with Clamp

Figure 3:
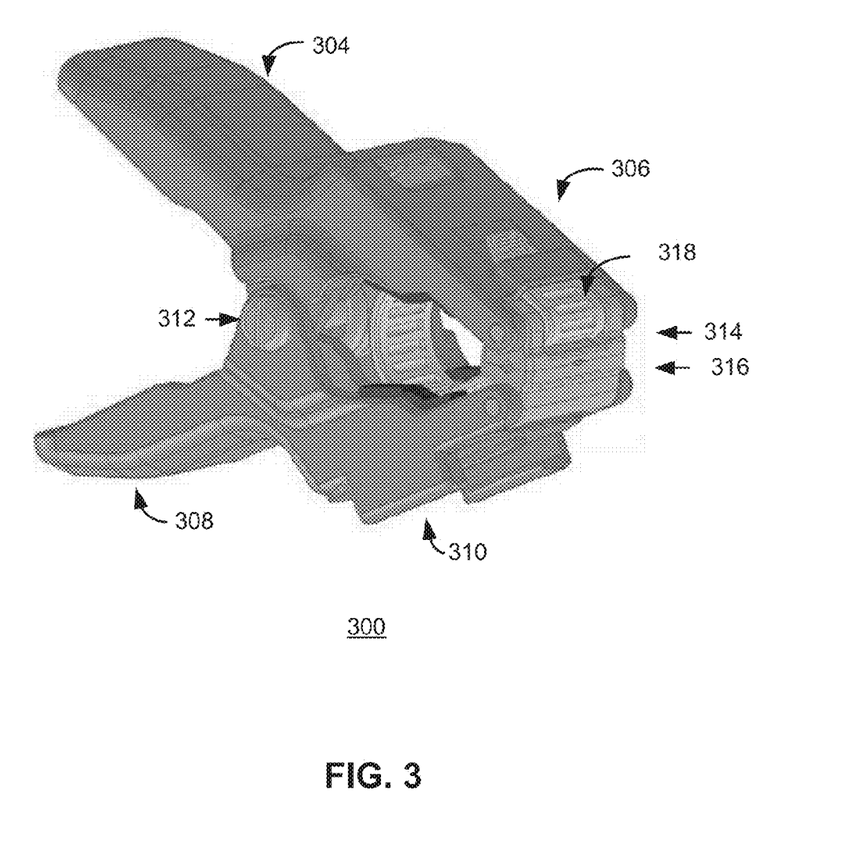
FIG. 3 illustrates a perspective view of a spring clamp mount, according to one embodiment.

A camera mounting system is used to secure a camera system to an apparatus, such as sports equipment, music equipment, or a user. To fasten the camera system to an apparatus, a camera housing 100 containing a camera is detachably secured to a mount, and the mount is detachably secured to the apparatus. FIG. 3 illustrates a spring clamp mount 300 for a camera housing 100, according to one embodiment. The spring clamp mount 300 includes, among other components, a first arm composed of a first handle 304 and a first jaw 306, and a second arm composed of a second handle 308 and a second jaw 310. The first and second arms are pivotally coupled to each other at a spring joint by a pin or a screw 312. It is noted that the first handle 304 and the first jaw 306 and the second handle 308 and the second jaw 310 may have a unibody construction with functional operation divided between the handle and jaw as further disclosed herein. In alternate embodiments the handle and jaw portions can be individually constructed and coupled, e.g., via adhesive, weld or connecting structure such as rivet or screw and bolt.

Operationally, when pressure is placed on the first 304 and second 308 handles, the first arm and second arms pivotally rotate around the screw 312 such that the first 306 and second 310 jaws are forcibly separated into an open position. When no pressure is placed on the first 304 and second 308 handles, the spring joint forcibly compresses the first 306 and second 310 jaws into a closed position. It should be noted that the closed position can refer to either the compression of the jaws together or the compression of the jaws around an apparatus and towards each other such that a space exists between the jaw ends.

The spring clamp mount 300 is configured to be detachably secured to an apparatus when the first 306 and second 310 jaws are in the closed position around at least a portion of the apparatus. For example, the spring clamp mount 300 may be secured to an apparatus with a diameter of up to two inches. In an embodiment, the first jaw 306 includes a first pivoting pad 314 and the second jaw 310 includes a second pivoting pad 316, so that when the first 306 and second 310 jaws are in the closed position, the first 314 and second 316 pivoting pads are forcibly compressed together. The pivoting pads 314/316 can be made of a compressible material (e.g., rubber, silicone, thick textile, etc.). When the spring clamp mount 300 has been secured to an apparatus, the first 314 and second 316 pivoting pads can be pivoted to an angle at which the pads have maximum possible contact with the apparatus. This provides a buttressing effect to further secure the spring clamp mount 300 to the apparatus by increasing the frictional forces between the spring clamp mount 300 and the apparatus.

The spring clamp mount 300 also includes a strap 318 configured to provide an additional buttressing effect to secure the spring clamp mount 300 to an apparatus. The strap 318 can be fixedly coupled to both the first jaw 306 and to the second jaw 310, adjustably coupled to the first jaw 306 and fixedly coupled to the second jaw 310, or adjustably coupled to both the first jaw 306 and to the second jaw 310. In one embodiment, the strap 318 is a ratcheted belt including multiple unidirectionally angled parallel grooves 404.

Figure 4:
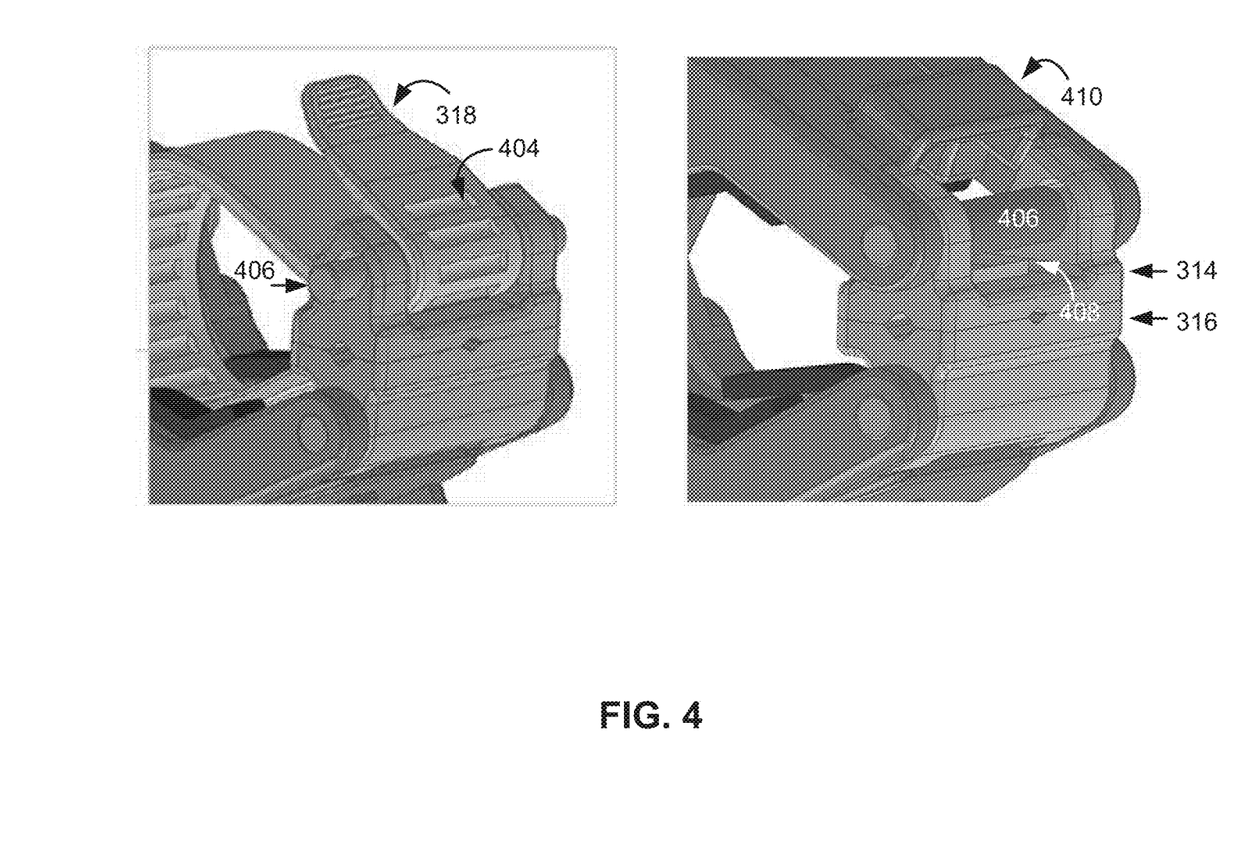
FIG. 4 illustrates close-up views of the clamp portion of a spring clamp mount, according to one embodiment.

FIG. 4 illustrates close-up views of a portion of the spring clamp mount depicting the strap 318 mechanism, according to one embodiment. Here, the strap 318 is adjustably coupled to the first jaw 306 and fixedly coupled to the second jaw 310. The strap 318 is configured to wrap around a pin 406 that is coupled to the first jaw 310. In an embodiment, the pin 406 is coupled to a bushing, reducing the force required to adjust the strap around the pin. Below the pin 406 is an elevated ridge 408 coupled to the first pivoting pad 314 of the first jaw 306. The strap 318 can be threaded between the pin 406 and the elevated ridge 408 and back around the first jaw 306 through a loop 410 in the first jaw 306. When the first 306 and second 310 jaws are in the closed position, the size of the gap between the elevated ridge 408 and the pin 406 is decreased and the elevated ridge 408 can be inserted into one of the grooves 404 of the strap 318, fixing the strap 318 into place.

The grooves 404 of the strap are angled such that while the spring clamp mount is in the closed position, the strap 318 can be pulled outwards and away from the spring clamp mount 300. At the same time, the strap 318 cannot slip backwards and into the spring clamp mount unless the spring clamp mount is placed into the open position, increasing the size of the gap between the elevated ridge 408 and the pin 406 and allowing the strap to move freely relative to the pin 406. Thus, if the spring clamp mount 300 has been secured to an apparatus, a user may pull on the strap 318 to tighten it around the apparatus to provide an additional buttressing effect. However, the strap 318 cannot loosen its hold on the apparatus until the first 306 and second 310 jaws move into the open position and release the strap.

In one embodiment, the strap 318 is not a ratcheted belt, but instead is an elastic belt containing multiple holes. A prong coupled to the first jaw 306 is configured to be inserted through one of the holes in the belt. When the first 306 and second 310 jaws are in the closed position around an apparatus, a user can tighten the belt around an apparatus and insert the prong through a hole in the belt, further securing the spring clamp mount 300 to the apparatus. In other embodiments, the strap 318 comprises a hook and loop system, a button system, a clip system, a magnet system, a ball and catch system, an adhesive system, or any other type of securing mechanism that is used to secure the spring clamp mount 300 to an apparatus.

In one embodiment, a buckle component on the camera housing 100 may be detachably secured to a buckle component on the spring clamp mount 300 to fasten the camera housing 100 to the spring clamp mount 300. In a further embodiment, the camera housing 100 has a female buckle component while the spring clamp mount 300 has a male buckle component. In another embodiment, the camera housing 100 has a male buckle component while the spring clamp mount 300 has a female buckle component. In yet another embodiment, the camera housing 100 is secured to a clip-style mount 122 as described earlier, and the spring clamp mount 300 is configured to receive the clip-style mount 122.

Figure 5:
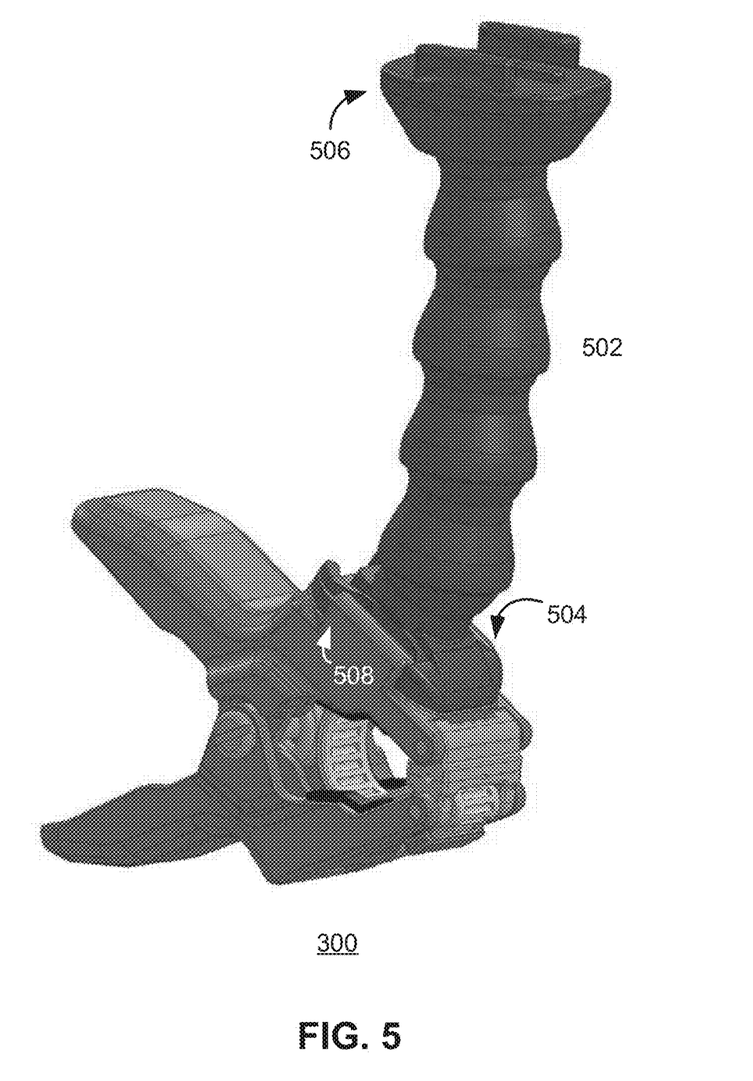
FIG. 5 illustrates a perspective view of a spring clamp mount coupled to a flexible neck, according to one embodiment.

In some embodiments, the camera housing is not directly attached to the spring clamp mount 300. FIG. 5 illustrates a flexible neck 502 coupled to the spring clamp mount 300. A camera housing can detachably couple to the flexible neck 502. The flexible neck 502 is forcibly configured to twist or bend, securing the flexible neck 502 into a desired position, and allowing a camera to capture photographs from any desired angle while coupled to the flexible neck 502. In one embodiment, the flexible neck 502 is a modular hose composed of multiple modular links. For example, the modular hose can be a Loc-Line® (from Lockwood Products, Lake Oswego, Oreg.) hose composed of multiple Loc-Line® links. In a further embodiment, the flexible neck 502 includes at least six Loc-Line® links, allowing the flexible neck 502 to bend 90 degrees or more.

In some embodiments, the flexible neck 502 is permanently attached to the spring clamp mount 300. In other embodiments, the flexible neck 502 includes a buckle component 504 that may detachably couple the flexible neck 502 to the spring clamp mount 300. For example, the flexible neck 502 can have a female buckle component 504 while the mount 300 has a male buckle component 508. In another embodiment, the flexible neck 502 has a male buckle component 504 while the mount 300 has a female buckle component 508.

The flexible neck 502 includes a second buckle component 506 that detachably couples the flexible neck 502 to a camera housing 100. In one embodiment, the flexible neck 502 has a female buckle component 506 while the camera housing 100 has a male buckle component. In another embodiment, the flexible neck 502 has a male buckle component 506 while the camera housing has a female buckle component. In addition, the camera housing 100 can be secured to a clip-style mount 122 as described earlier, and the flexible neck 502 can be configured to receive the clip-style mount 122. In further embodiments, the buckle component 506 of the flexible neck 502 couple to a second flexible neck 502, thus creating an extra-long flexible neck. A camera housing 100 may then be detachably coupled to the free end of the second flexible neck 502.

In an example use scenario, a user attaches a flexible neck 502 to a spring clamp mount 300, and attaches a camera housing 100 enclosing a camera to the flexible neck 502. The user then exerts pressure on the first 304 and second 308 handles of the spring clamp mount, forcing the first 306 and second 310 jaws into the open position. Next, the user places the jaws (306/310) around a pole and releases the pressure from the first 304 and second 308 handles, moving the first 306 and second 310 jaws into the closed position to secure the spring clamp mount 300 to the pole. The first 314 and second 316 pivoting pads are pivoted at an angle at which the pads have formed a v-block around the pole. The user pulls on the strap 318, tightening the strap's 318 hold on the pole. Finally, the user bends the flexible neck 502 to a desired angle for the mounted camera to take photographs.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A mounting system configured to detachably couple a camera system to an apparatus, comprising:
   a spring clamp comprising:
      a first arm comprising a first handle and a first jaw;
      a second arm comprising a second handle and a second jaw, the second arm pivotally coupled to the first arm at a spring joint, the first and second jaws forcibly separable into an open position in response to pressure on the first and second handles, and the spring joint otherwise forcibly compressing the first and second jaws together into a closed position;
   a strap comprising an inside surface and an outside surface, the strap fixedly coupled to the first arm and adjustably coupled to the second arm, the strap configured to secure an apparatus by tightening around at least a portion of the apparatus when the first and second jaws are in the closed position around at least the portion of the apparatus such that at least a portion of the inside surface of the strap abuts a surface of the portion of the apparatus, such that at least a first portion of the outside surface of the strap faces an inside surface of the first arm and an inside surface of the second arm, and such that at least a second portion of the outside surface of the strap faces an outside surface of the second arm; and
   a mounting component coupled to at least one of the arm components, the mounting component configured to couple to a camera system.

2. The mounting system of claim 1, the first jaw further comprising a first pivoting pad and the second jaw further comprising a second pivoting pad.

3. The mounting system of claim 2, the first and second pivoting pads each comprising a compressible material.

4. The mounting system of claim 3, the first arm and the second arm configured to forcibly compress the first pivoting pad and the second pivoting pad when the spring clamp is in the closed position.

5. The mounting system of claim 1, the strap configured to (1) secure the apparatus by tightening around at least a portion of the apparatus when the first and second jaws are in the closed position, and (2) release the apparatus when the first and second jaws are in the open position.

6. The mounting system of claim 1, the strap comprising a ratcheted belt component comprising unidirectional grooves.

7. The mounting system of claim 6, further comprising an elevated ridge coupled to the first jaw, the elevated ridge configured for insertion into a groove of the ratcheted belt component, the insertion of the elevated ridge into a groove preventing the strap from loosening when the first and second jaws are in the closed position.

8. The mounting system of claim 7, further comprising a pin coupled to the first jaw, the strap threaded between the pin and the ridge.

9. The mounting system of claim 8, the pin further coupled to a bushing.

10. The mounting system of claim 1, the camera system comprising a second mounting component, the mounting system and the camera system detachably coupled via the mounting component and the second mounting component.

11. The mounting system of claim 1, further comprising a flexible neck component comprising a second mounting component on a first end of the flexible neck component detachably coupled to the mounting component of the mounting system and a third mounting component on a second end of the flexible neck component configured to detachably couple to the camera system.

12. The mounting system of claim 11, the flexible neck component comprising a modular hose.

13. A mounting system configured to detachably couple to an apparatus, comprising:
 a spring clamp comprising a first arm and a second arm, the second arm pivotally coupled to the first arm at a spring point, the first and second arms configured to be in an open position or a closed position;
 a strap comprising an inside surface and an outside surface, the strap fixedly coupled to the first arm and adjustably coupled to the second arm, the strap comprising a ratcheted belt component, and the strap configured to secure an apparatus by tightening around at least a portion of the apparatus when the first and second arms are in the closed position around at least the portion of an apparatus such that at least a portion of the inside surface of the strap abuts a surface of the portion of the apparatus, such that at least a first portion of the outside surface of the strap faces an inside surface of the first arm and an inside surface of the second arm, and such that at least a second portion of the outside surface of the strap faces an outside surface of the second arm; and
 a mounting component coupled to at least one of the arm components, the mounting component configured to couple to an electronic device.

14. The mounting system of claim 13, the ratcheted belt component comprising unidirectional grooves.

15. The mounting system of claim 14, further comprising an elevated ridge coupled to the first arm, the elevated ridge configured for insertion into a groove of the ratcheted belt component, the insertion of the elevated ridge into a groove preventing the strap from loosening when the first and second arms are in the closed position.

16. The mounting system of claim 13, the electronic device comprising a second mounting component, the mounting system and the electronic device detachably coupled via the mounting component and the second mounting component.

* * * * *